US012808608B2

United States Patent

(12) United States Patent
Bell et al.

(10) Patent No.: US 12,808,608 B2
(45) Date of Patent: Nov. 24, 2026

(54) FLAMELESS GLYCOL HEATER

(71) Applicant: ConleyMax Inc., Calgary (CA)

(72) Inventors: Patrick G. Bell, Calgary (CA); William Beckie, Calgary (CA)

(73) Assignee: ConleyMax Inc., Calgary (CA)

( * ) Notice: Subject to any disclaimer, the term of this patent is extended or adjusted under 35 U.S.C. 154(b) by 361 days.

(21) Appl. No.: 18/396,906

(22) Filed: Dec. 27, 2023

(65) Prior Publication Data

US 2024/0133638 A1 Apr. 25, 2024

Related U.S. Application Data

(63) Continuation of application No. 17/667,915, filed on Feb. 9, 2022, now Pat. No. 11,874,069, which is a continuation of application No. 16/452,177, filed on Jun. 25, 2019, now Pat. No. 11,274,883, which is a continuation of application No. 14/037,123, filed on Sep. 25, 2013, now Pat. No. 10,408,548.

(51) Int. Cl.

| | |
|---|---|
| ***F28D 21/00*** | (2006.01) |
| *B60H 1/02* | (2006.01) |
| *F22B 1/18* | (2006.01) |
| *F22B 3/06* | (2006.01) |

(52) U.S. Cl.

CPC .............. *F28D 21/001* (2013.01); *B60H 1/02* (2013.01); *F22B 1/1807* (2013.01); *F22B 3/06* (2013.01)

(58) Field of Classification Search

USPC ........................................................... 432/29

See application file for complete search history.

(56) References Cited

U.S. PATENT DOCUMENTS

| | | | |
|---|---|---|---|
| 3,231,016 | A | 1/1966 | Campbell et al. |
| 4,264,826 | A | 4/1981 | Ullmann |
| 4,680,975 | A | 7/1987 | Dodt |
| 4,881,495 | A | 11/1989 | Tornare et al. |
| 5,098,036 | A | 3/1992 | Brigham et al. |
| 5,190,249 | A | 3/1993 | Whitmire et al. |
| 5,222,696 | A | 6/1993 | Brigham et al. |
| 5,709,201 | A | 1/1998 | Puett, Jr. |
| 6,761,135 | B1 | 7/2004 | Becktold |
| 6,883,467 | B2 | 4/2005 | Holden |
| 7,337,828 | B2 | 3/2008 | Lange |

(Continued)

FOREIGN PATENT DOCUMENTS

| | | | |
|---|---|---|---|
| CA | 2741507 | A1 | 9/2012 |
| CA | 2811829 | A1 | 7/2014 |
| JP | 10175419 | A | 6/1998 |

OTHER PUBLICATIONS

Canadian Office Action for Canadian Patent App. No. 2,815,986 dated Aug. 19, 2013 (2 pages).

(Continued)

*Primary Examiner* — Helena Kosanovic
*Assistant Examiner* — John E Bargero
(74) *Attorney, Agent, or Firm* — Auito IP Law, PLLC

(57) ABSTRACT

A fluid heating process which does not utilize an open flame, heat is created by a rotating prime mover(s) driving a hydraulic heat generator. Heat is also collected from the prime mover cooling system, and any exhaust heat generated by the prime mover. The heat energy is collected from all these sources, and transmitted through heat exchangers to generate a hot fluid, which can be used to heat other fluids and used for any application where heat is required.

20 Claims, 1 Drawing Sheet

(56) References Cited

U.S. PATENT DOCUMENTS

| | | | |
|---|---|---|---|
| 7,424,916 | B2 | 9/2008 | Foster et al. |
| 7,614,367 | B1 | 11/2009 | Frick |
| 7,637,232 | B2 | 12/2009 | Foster |
| 7,766,077 | B2 | 8/2010 | Masters et al. |
| 7,866,380 | B2 | 1/2011 | Masters et al. |
| 8,291,868 | B2 | 10/2012 | Whallon |
| 8,469,283 | B2 | 6/2013 | Sanger et al. |
| 8,484,963 | B2 | 7/2013 | Jackson et al. |
| 9,228,760 | B2 | 1/2016 | Welle et al. |
| 2003/0049139 | A1 | 3/2003 | Coney et al. |
| 2004/0144200 | A1 | 7/2004 | Giordano et al. |
| 2005/0121532 | A1 | 6/2005 | Reale et al. |
| 2006/0185621 | A1 | 8/2006 | Foster et al. |
| 2006/0260788 | A1 | 11/2006 | Masters et al. |
| 2007/0261823 | A1 | 11/2007 | Masters et al. |
| 2008/0185453 | A1 | 8/2008 | Sanger et al. |
| 2010/0006668 | A1 | 1/2010 | Alexander et al. |
| 2010/0139577 | A1 | 6/2010 | Whallon |
| 2010/0192875 | A1 | 8/2010 | Frick |
| 2011/0005757 | A1 | 1/2011 | Hebert |
| 2011/0036418 | A1 | 2/2011 | Hendy |
| 2011/0079561 | A1 | 4/2011 | Masters et al. |
| 2011/0120427 | A1 | 5/2011 | Andersson |
| 2011/0185713 | A1 | 8/2011 | Koopmann et al. |
| 2011/0297353 | A1 | 12/2011 | Stegeman |
| 2012/0048717 | A1 | 3/2012 | Frick |
| 2012/0174987 | A1 | 7/2012 | Crawford et al. |
| 2013/0270352 | A1 | 10/2013 | Roth et al. |
| 2014/0174691 | A1 | 6/2014 | Kamps et al. |

OTHER PUBLICATIONS

Canadian Office Action for Canadian Patent App. No. 2,828,522 dated Jan. 23, 2014 (2 pages).

Canadian Office Action for Canadian Patent App. No. 2815986 dated Aug. 13, 2014 (2 pages).

Extended (Supplementary) European Search Report dated Nov. 4, 2016, issued in European Patent Application No. 14762281.5 (8 pages).

Int'l Preliminary Report on Patentability (Form PCT/IB/373) issued in Int'l App. No. PCT/CA2014/050285 dated Sep. 15, 2015, with Form PCT/ISA/237 (6 pages).

Int'l Search Report (ISR) dated Dec. 9, 2014, issued in Int'l App. No. PCT/CA/2014/050919 (3 pages).

Int'l Search Report (ISR) of PCT/CA2014/050286 dated Jun. 9, 2014.

Notification of Transmittal of Translation of the Int'l Preliminary Amendment Report on Patentability (Forms PCT/IB/326) of Int'l App. No. PCT/CA2014/050919, dated Mar. 29, 2016 with Form PCT/IB/237 and PCT/IB/373. (7 pages).

The Written Opinion of Int'l Searching Authority Int'l App. No. PCT/CA2014/050919 dated Dec. 9, 2014 with Form PCT/ISA/237 (5 pages).

USPTO Office Action for U.S. Appl. No. 13/834,942 dated Jan. 11, 2017.

USPTO Office Action for U.S. Appl. No. 13/834,942 dated Sep. 20, 2017.

USPTO Office Action for U.S. Appl. No. 13/835,617 dated Jan. 10, 2018.

USPTO Office Action for U.S. Appl. No. 13/835,617 dated Oct. 20, 2016.

USPTO Office Action for U.S. Appl. No. 13/835,617 dated Jun. 23, 2015.

USPTO Office Action for U.S. Appl. No. 13/835,617 dated Mar. 25, 2016.

USPTO Office Action for U.S. Appl. No. 13/835,617 dated Oct. 7, 2014.

USPTO Office Action for U.S. Appl. No. 14/037,123 dated Jun. 17, 2016.

Written Opinion dated Jun. 9, 2014 issued in Int'l App. No. PCT/CA2014/050286.

FLAMELESS GLYCOL HEATER

CROSS-REFERENCE TO RELATED APPLICATIONS

This application claims priority to and is a continuation of pending U.S. application Ser. No. 17/667,915, filed on Feb. 9, 2022, which is a continuation of U.S. application Ser. No. 16/452,177 filed on Jun. 25, 2019 (now U.S. Pat. No. 11,274,883, issued Mar. 15, 2022), which is a continuation of U.S. application Ser. No. 14/037,123 filed on Sep. 25, 2013 (now U.S. Pat. No. 10,408,548, issued Sep. 10, 2019.) The content of the above documents is incorporated herein by reference in its entirety.

BACKGROUND

This invention generally relates to processes used to heat and pump industrial fluids, where the heating process does not require an open flame.

Certain industrial applications require large volumes of heated fluid, such as water, glycol, hydrocarbons or caustic solutions. Although the present application is not limited to any one of these fluids, this application will refer to glycol as the heated fluid. Also, although many types of fluids, such as glycol and oil, may be used as a hydraulic heat generator fluid, this application will refer to oil as the heating fluid.

Specific environments may require that an open flame not be present. This commonly occurs in the energy industry. This fluid heating system and process described herein was created to heat fluids in these environments.

Common practice has been to truck water to several tanks located at an oil or gas well location. The water is heated by open flamed trucks which utilize diesel or propane fired burners. However, these burners are energy inefficient (e.g., utilizing excessive amounts of fuel) and hazardous (e.g., causing fires, severe burns, and fatalities).

A flameless heating system removes these hazards by supplying hot glycol (e.g., temperature less than 100 degrees Celsius). There is no risk of explosion or burns due to open flames or high temperature steam. With the flameless heating system, once the tanks are filled, the heater is moved to the tank site, and heats the water, or any other fluid contained in the tanks, to a desired temperature. The heater generates hot glycol, which is pumped to the tanks. The tanks are equipped with a steam tube or similar heat exchanger that allows the hot glycol to transfer heat to the fluid in the tank. Multiple tanks can be heated, for example, by connecting them in series with hoses and quick connect couplers or with the use of a manifold and connected in parallel. The heating process is efficient and safe, making the best use of fuel in a flameless environment.

SUMMARY

One aspect of the present invention consists of a number of components connected in such a way that the process provides efficient and flameless heat. The components are generally trailer mounted, but may also be truck or skid mounted.

The largest component is a prime mover. The prime mover is most often a diesel engine; however, gasoline or natural gas engines, or an electric drive may also be used depending on the environmental considerations. Connected directly to a drive shaft of the prime mover is a hydraulic heat generator. This component utilizes a majority of power available from the prime mover, and converts this energy into heat. The hydraulic heat generator can either be built as one or more components. It consists of a hydraulic pump to provide pressure and flow for the heat generator.

The heat generator can be attached to the hydraulic pump or standalone and connected via a hydraulic hose. The heat generator provides heat, for example, by shearing oil. One way this is accomplished is by pumping the oil at high pressure and volume and forcing it through different sizes of orifices. This heat is transferred to the glycol through a liquid to liquid heat exchanger.

Also driven by the prime mover is the main pump to move the glycol through the system. This pump, for example, is typically a centrifugal pump, and allows movement of glycol through the heating unit, out to wherever it is needed by using hoses and is returned back to the heating unit. This is a closed loop system, so there is no contamination or loss of the glycol.

The remaining major components to the system are heat exchangers.

A first heat exchanger, for example, is a liquid-to-liquid heat exchanger, mentioned above, that transfers heat from the oil, generated by the hydraulic heat generator, to the glycol.

A second heat exchanger, for example, is also a liquid-to-liquid heat exchanger, which transfers heat generated in the engine coolant to the glycol. This fluid is pumped by the main pump, as mentioned above.

A third heat exchanger, for example, is an air-to-liquid heat exchanger, (e.g., an intercooler) which transfers heat generated in the turbocharger compressor of the prime mover to the glycol.

A fourth heat exchanger, for example, is also an air-to-liquid heat exchanger, which transfers the heat generated in the engine exhaust to the glycol.

Other system components include, for example, a fuel tank to operate the engine, glycol and oil reservoirs, a trailer to house the components, and a control system to maintain operation of the system and alarm in the event of a mechanical failure.

The closed loop glycol heating process of the present invention has a capability of approximately 1.2M Btu.

BRIEF DESCRIPTION OF THE DRAWING

The following drawing illustrates an example of various components of the invention disclosed herein, and is for illustrative purposes only.

DETAILED DESCRIPTION

Figure 1:
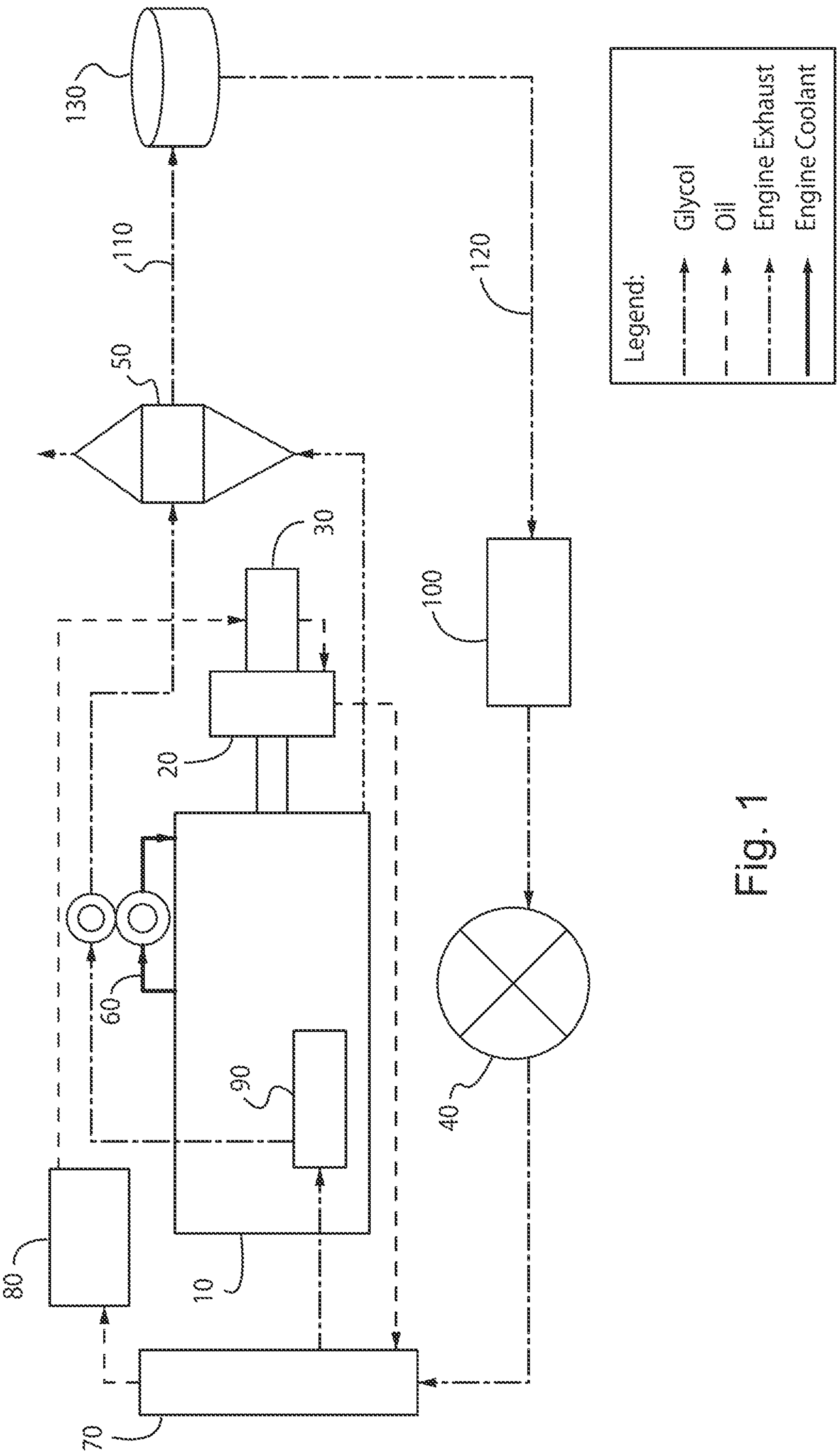
FIG. 1 is a schematic of one embodiment of a flameless glycol heater.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Reference will now be made to FIG. 1, a more detailed description of the flameless heat generation process. Each component will be described in detail, followed by an overview of the heat generation process.

The largest component of the flameless process, for example, is prime mover 10. The prime mover 10 can be any type of engine, fueled by a variety of fuels such as diesel, propane or natural gas. It can be electrical in certain applications. The fuel driven engines, for example, are typically set up like a marine engine, which will have a liquid cooled intercooler to cool and increase the density of the air travelling from the compressor side of the turbocharger to the engine intake. It will also have a liquid/engine coolant heat exchanger to keep the engine running within its ideal temperature range. For the purpose of this application the liquid used is glycol.

Attached to the prime mover 10 are heat generator 20 and hydraulic pump 30. Oil is pumped by the hydraulic pump 30 through the heat generator 20. In the heat generator 20 the oil is sheared under high pressure and volume by pumping it through orifices of different sizes. As stated previously, this hydraulic heat generator can be a combined unit or separate components. Between the engine 10 and hydraulic heat generator, for example, is a torsional vibration dampener (not shown), which is used to smooth out vibrations created by the prime mover 10. The use of the torsional vibration dampener, for example, extends the life of the output shaft and the hydraulic heat generator.

Centrifugal pump 40 (e.g., glycol pump) is configured to pump glycol to the various components within the flameless heater and to wherever the hot glycol is needed. This is a closed loop system, where the glycol is continually circulated within the system.

Exhaust heat exchanger 50, in communication with the prime mover 10, is constructed, for example, of stainless steel or similar non corrosive material. In this example, the exhaust of the prime mover 10 enters the bottom of the heat exchanger 50, where it is directed upward to heat tube bundles containing glycol. Typically the exhaust gases enter the exhaust heat exchanger 50 at temperatures of up to 700 F (400 C) and exit the exhaust heat exchanger 50 at 70 F (25 C).

In this example, glycol is pumped through engine coolant/glycol heat exchanger 60 in order to keep the engine coolant within the appropriate operating range of the engine. This heat exchanger 60 is constructed, for example, of marine grade material.

In this example, heat exchanger 70 is configured to transfer heat from the oil to the glycol. Heat exchanger 70 is constructed, for example, of marine grade material.

In this example, reservoir tank 80 (e.g., oil reservoir) is configured to hold the oil. Reservoir tank 80 is typically 50 gallons (200 litres) in size and has an attached filter for filtering the oil. However, one of ordinary skill in the art would utilize varying sizes that are appropriate.

In this example, reservoir tank 100 (e.g., glycol reservoir) is configured to hold the glycol. Reservoir tank 100 is typically 50 gallons (200 Litres) in size and has an attached filter for filtering the glycol. However, one of ordinary skill in the art would utilize varying sizes that are appropriate.

In this example, hose 110 and hose 120 are configured to transfer the glycol. Each of hoses 110 and 120 can be of various lengths and may be connected to other hoses with, for example, quick connect couplers.

In one example, the heating process consists of collecting heat from four different components and transferring it to the glycol. For example, the four heat source components are the hydraulic heat generator 20, engine coolant heat exchanger 60, engine intercooler 90 and the exhaust heat exchanger 50. The sequence of glycol flow can be in any order, for example, mostly depending on ease of piping within the flameless heater.

In this example, the heating process begins by starting the prime mover 10. Once the prime mover 10 has warmed up, the prime mover 10 is throttled up to maximum power and rpm. At this time the hydraulic heat generator begins to generate heat and the heat is transferred to the oil, which is pumped from the reservoir 80, through the hydraulic pump 30, through the heat generator 20, and through the heat exchanger 70. It is at the heat exchanger 70, for example, that heat is transferred from the oil to the glycol.

Once the fluid has passed through the heat exchanger 70, it is returned to the reservoir 80, where it is stored and filtered until it is pumped back through the cycle. The oil is in a closed system that continually follows this route. This is one source of heat.

From the outlet of the centrifugal pump 40, the glycol is pumped to the oil/glycol heat exchanger 70. In this example, the glycol is then pumped to intercooler 90. The purpose of the intercooler 90, for example, is to cool the air coming from the compressor side of the turbocharger. As the air is compressed by the turbocharger it is heated. By passing through the intercooler 90, this air is cooled by the glycol. This results in the air being cooled as well as the glycol being heated at the same time. This is the second source of heat.

The glycol continues from the intercooler 90 to the engine coolant heat exchanger 60. The heat exchanger 60 allows the heat from the hot coolant to be transferred to the glycol. Sufficient volume of glycol is pumped to keep the engine operating within its specified temperature range. This is the third source of heat.

After exiting the engine heat exchanger 60, the glycol is pumped to the exhaust heat exchanger 50. In this exchanger 50, the hot exhaust from the engine which can be at 700 F (400 C) is allowed to flow across a series of pipes that the glycol flows through. This exchanger 60 is sized so that the exhaust output temperature is at approximately 70 F (20-25 C). From the outlet of this heat exchanger 60 the glycol is pumped to the water tank 130 where the heat from the hot glycol is transferred to the water. From there it is returned to the glycol reservoir 100 until it is pumped through the system 1 again.

Although an embodiment of the instant invention has been described above and illustrated in the accompanying drawing in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A flameless heater, comprising:

a first circulation path configured to circulate a heating fluid;

a second circulation path configured to circulate a heated fluid;

a prime mover arranged in the second circulation path, the prime mover including engine coolant and engine exhaust;

a heat generator arranged in the first circulation path and configured to heat the heating fluid received from an oil reservoir;

a first heat exchanger arranged in both the first circulation path and the second circulation path, the first heat exchanger configured to transfer heat from the heating fluid to the heated fluid;

a main pump positioned upstream of the first heat exchanger, the main pump being the sole pump that circulates the heated fluid in the second circulation path, the second circulation path being configured as a single pump, single-path circulation loop controlling all heated-fluid flow during a heating operation;

a second heat exchanger arranged in the second circulation path downstream of the first heat exchanger, the second heat exchanger configured to transfer heat from circulating engine coolant to the heated fluid; and a third heat exchanger arranged in the second circulation path downstream of the second heat exchanger, the third heat exchanger configured to transfer heat from the engine exhaust to the heated fluid, wherein the second circulation path defines a single serial flow path without parallel branches during a heating operation, the main pump driving the heated fluid sequentially through the first heat exchanger, the second heat exchanger, and the third heat exchanger.

2. The flameless heater of claim 1, further comprising a remote tank heat exchanger located external to a chassis of said flameless heater, wherein the main pump drives the heated fluid sequentially through the first heat exchanger, the second heat exchanger, and the third heat exchanger, and then directly to the remote tank heat exchanger before return of the heated fluid to a heated-fluid reservoir.

3. The flameless heater of claim 2, wherein delivery of the heated fluid to the remote tank heat exchanger is configured to heat water contained in the remote tank.

4. The flameless heater of claim 1, wherein the second circulation path is free of any auxiliary pump, booster pump, bypass pump, or pump-driven parallel branch.

5. The flameless heater of claim 1, wherein flow of the heated fluid in the second circulation path is governed exclusively by the main pump during a heating operation.

6. The flameless heater of claim 1, wherein the main pump is a centrifugal pump.

7. The flameless heater of claim 1, wherein the second circulation path lacks any bypass conduit, manifold, or flow-splitting structure.

8. The flameless heater of claim 2, wherein the remote tank heat exchanger is coupled to the third heat exchanger by hoses including couplers.

9. The flameless heater of claim 1, wherein the third heat exchanger is vertically oriented such that engine exhaust enters at a bottom inlet and flows upward across tubes carrying the heated fluid.

10. The flameless heater of claim 9, wherein exhaust gas exits the third heat exchanger at about 20-25° C.

11. The flameless heater of claim 1, wherein the heated fluid is glycol.

12. The flameless heater of claim 1, wherein the heating fluid is oil.

13. A method for flamelessly heating a liquid, comprising:

moving a heating fluid through a first circulation path;

moving a heated fluid through a second circulation path;

powering a prime mover;

heating the heating fluid with a heat generator arranged in the first circulation path;

transferring heat from the heating fluid to the heated fluid at a first heat exchanger arranged in both the first and the second circulation paths;

operating a main pump to drive the heated fluid sequentially through, in order, a second heat exchanger that transfers heat from engine coolant and a third heat exchanger that transfers heat from engine exhaust, wherein the main pump is the sole pump that circulates the heated fluid in the second circulation path, and the second circulation path is configured as a single pump, single-path circulation loop controlling all heated-fluid flow during a heating operation.

14. The method of claim 13, wherein the heated fluid is delivered from the third heat exchanger directly to a remote tank heat exchanger before returning the heated fluid to a reservoir.

15. The method of claim 13, wherein the second circulation path is free of any auxiliary pump, booster pump, bypass pump, or pump-driven parallel branch.

16. The method of claim 13, wherein the third heat exchanger is vertically oriented with bottom-entry exhaust flow and the exhaust gas exits the third heat exchanger at about 20-25° C.

17. The flameless heater of claim 2, wherein two or more remote tank heat exchangers are connected in series to receive the heated fluid sequentially before the heated fluid returns to the heated-fluid reservoir.

18. The method of claim 14, wherein the remote tank heat exchanger comprises a heat-transfer coil disposed within the remote tank to transfer heat to water contained in the remote tank.

19. The flameless heater of claim 1, further comprising a torsional vibration damper positioned between the prime mover and the heat generator.

20. The flameless heater of claim 1, wherein the first heat exchanger is constructed of marine-grade material.

* * * * *